United States Patent [19]
Bingham

[11] 3,758,192
[45] Sept. 11, 1973

[54] REFLEX-REFLECTIVE STRUCTURES INCLUDING FABRIC AND TRANSFER FOILS

[75] Inventor: Wallace Karl Bingham, North Saint Paul, Minn.

[73] Assignee: Minnesota Mining and Manufacturing Company, St. Paul, Minn.

[22] Filed: Aug. 20, 1970

[21] Appl. No.: 65,531

Related U.S. Application Data

[63] Continuation of Ser. No. 792,542, Jan. 21, 1969, abandoned.

[52] U.S. Cl................... 350/105, 350/109, 350/288
[51] Int. Cl. ............................................ G02b 5/12
[58] Field of Search............................. 350/105, 109; 40/125, 130, 135; 94/1.5

[56] References Cited
UNITED STATES PATENTS

| | | | |
|---|---|---|---|
| 2,543,800 | 3/1951 | Palmquist et al. ................... | 350/105 |
| 3,253,146 | 5/1966 | DeVries.............................. | 350/105 |
| 2,827,720 | 3/1958 | Phillippi............................. | 40/135 |
| 3,172,942 | 3/1965 | Berg................................... | 350/105 |

*Primary Examiner*—David Schonberg
*Assistant Examiner*—Michael J. Tokar
*Attorney*—Alexander, Sell, Steldt & De La Hunt

[57] ABSTRACT

A reflex-reflecting structure in which glass beads, preferably within the size range of 25 to 250 microns and having a refractive index of at least 1.8, are hemispherically surrounded by a binder containing specularly reflective nacreous pigment particles which have maximum dimensional sizes falling within the range of eight to 30 microns and thicknesses within the range of 25 to 200 millimicrons. Pigmented color layers and adhesive layers may be provided over the binder layer.

16 Claims, 8 Drawing Figures

PATENTED SEP 11 1973 3,758,192

INVENTOR.
WALLACE KARL BINGHAM
BY Kinney, Alexander,
Sell, Steldt & DeLaHunt
ATTORNEYS

REFLEX-REFLECTIVE STRUCTURES INCLUDING FABRIC AND TRANSFER FOILS

This application is a continuation of application Ser. No. 792,542 filed Jan. 21, 1969, now abandoned.

BACKGROUND OF THE INVENTION

The present invention relates to colored reflex-reflecting structures, particularly reflex-reflecting signs, fabrics and transfer films, in which a monolayer of small transparent glass beads or microspheres is embedded in a binder layer having a reflective nacreous pigment embedded therein.

In general, reflex-reflecting structures based on glass microspheres partially embedded in a binder layer containing reflective material are well known. Aluminum flake is often the preferred material because it is a specular reflector providing relatively high reflex-reflective efficiency in conjunction with high index glass beads. However, it has the disadvantage of having a grey color or giving a greyish cast to the structure under daytime viewing conditions. To compensate for this, others have added various coloring bodies to the top layer; e.g. see Nellessen, U.S. Pat. No. 3,251,704 but while this represents an advance in the art, a "true" color is still difficult to obtain due to the presence of the aluminum. On the other hand, diffuse reflecting material such as $TiO_2$ may be used, but the reflective efficiency is about 1/8 to 1/10 or even less than that of metal flake.

While natural and synthetic nacreous or pearlescent pigments have been known for many years for decorative purposes, as far as I am aware they have not been shown to be practical as the reflector material in any beaded reflex-reflective constructions, signs, fabrics or the like.

Indeed, many nacreous pigments fail to provide any improvement in reflex-reflective efficiency as compared to the use of $TiO_2$ pigments. However, as more fully disclosed hereinafter I have found that by using sufficient nacreous pigment (within certain ranges as to particle size and thickness) very efficient reflex-reflective structures can be produced, which tend to approach the efficiencies obtained with the use of aluminum flake, and which at the same time avoid the undesirable "off-colors" that result from employing metallic flake.

If colored pigments such as titanium dioxide are used the reflex-reflectivity is substantially diminished, and the color tends to be an off-white or have a yellowish cast to it.

Another commercially successful, reflex-reflecting structure is as disclosed in Palmquist et al, U.S. Pat. No. 2,567,233 which issued Sept. 11, 1951, in which both silvered and various colored reflex-reflecting fabrics are disclosed. These fabrics are likewise brilliantly reflex-reflecting under nighttime viewing conditions, have good flexibility under a wide range of temperatures and resistance to degradation when laundered or cleaned, but suffer the same disadvantage as the aforementioned transfer films inasmuch as their daytime appearance is either silver-gray, or lacking in intensity or brilliance of coloration, and thus while a white fabric has long been desired, the "whitest" color has been silver-grey, blue fabrics are not as blue as desired, etc.

Others have also addressed themselves to the problem of producing a white reflex-reflecting fabric or to increasing the color intensity of colored reflex-reflecting fabrics, and some such structures have recently been sold internationally.

One such white fabric appears to use a clear plasticized vinyl or rubber binder (without any $TiO_2$ reflective coat) in conjunction with 1.9 index glass beads, the binder being coated on a white fabric. The color intensity of this product is good and the flexibility or hand of the material is also good; however, the resistance of this structure to laundering and dry cleaning is very poor and the reflex-reflection capabilities for a white fabric are very low, i.e., a photometer reading of about 4.5 is all that is achieved by such a structure.

In another recent commercial reflex-reflecting fabric, the construction is generally the same as that of the just-mentioned white fabric, but the binder layer has been pigmented with $TiO_2$ and the laundry and dry cleaning resistance has been improved by using a different binder material, as is indicated by the fact that the whiteness of this fabric is not as intense as that of the above-mentioned structure, this fabric having a somewhat yellowish cast or appearance. Photometer readings are in the order of 7 for this white material.

In contrast, the present invention provides colored or white reflex-reflecting fabrics which have excellent resistance to laundering and dry cleaning, which have excellent color intensities or hues, and which exhibit excellent reflex-reflection, i.e., photometer readings with white fabrics can be in the order of 15 to 20 or even higher.

The present invention also provides colored reflex-reflecting signs and markers offering excellent color in combination with surprisingly high photometer readings.

As used herein, photometer readings (indicated by the abbreviation "PV") are expressed in terms of the reflection intensities for the various constructions as measured by a photometer located close to the beam of incident light, the divergence angle between the light source and photometer being one-third of a degree (the divergence angle being the angle subtended between straight lines connecting the light source to the reflective area and connecting the reflective area to the photometer).

Unless otherwise indicated, the reflection intensities were measured at a 5° angle of incidence (the angle of incidence is the angle subtended between a straight line connecting the source to the reflective area and a line perpendicular to the plane of the reflective area), the photometer used being obtained from the Photovolt Corporation, New York, (Model 20).

SUMMARY OF THE INVENTION

The present invention provides reflex-reflecting structures comprising a plurality of layers in which the outermost layer comprises a monolayer of glass beads, preferably having diameters within the range of 25 to 250 microns and a refractive index of at least 1.8, the beads being approximately hemispherically embedded in a binder material, such as a substantially clear and colorless resin, the binder containing specularly reflective nacreous pigment particles which have a maximum dimension size falling within the range of 8 to 30 microns but less than the diameter of the glass beads and a thickness within the range of 25 to 200 millimicrons, the binder preferably containing at least about 15 percent by weight of pigment based on the total vehicle solids (i.e., all of the solids in the binder system including resin, dryer and pigments), and sufficient of said nacreous pigment particles being in at least tangential, preferably contiguous, cup-like surface contact with the undersurface of the glass beads to form reflex-reflecting elements therewith. The binder is preferably transparent but may contain sufficient $TiO_2$ or other whitening agents to give it a white appearance, if desired. The binder may alternatively, or in addition, contain other coloring matter to give the surface layer a colored (e.g. blue or red) appearance or contain a fluorescent pigment. Behind the binder layer one may provide additional coloring or opacifying layers, which may also serve as adhesive layers, or various types of per se known adhesive layers may be added. If the adhesive layer is a pressure-sensitive adhesive a further strippable liner (commonly called a low-adhesion liner), may be provided. In the case where the substrate is a fabric, the binder should be sufficiently flexible so that it does not interfere with the feel or hand, and drapability of the fabric.

BRIEF DESCRIPTION OF THE DRAWINGS

Reflex-reflecting structures of the present invention are illustrated in the accompanying drawings in which.

DETAILED DESCRIPTION OF THE DRAWINGS

Figure 1:
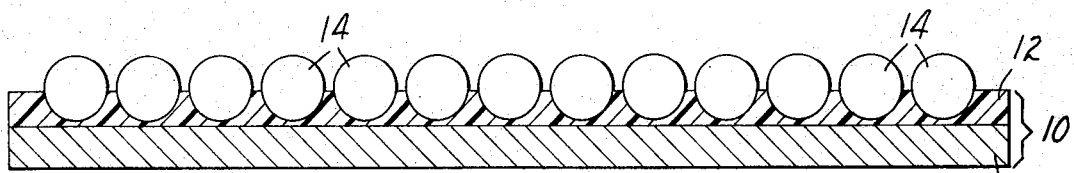
FIG. 1 is a cross-sectional view of a presently preferred stage in the manufacture of reflex-reflecting fabrics and transfer foils according to the invention, in which glass microspheres are temporarily approximately hemispherically embedded in a thermoplastic carrier coating on a carrier base.

Referring now to FIGS. 1–4, a carrier 10 comprising a dimensionally stable sheet material 11 with a thermoplastic coating 12 adhered thereto has a monolayer of glass beads 14 approximately hemispherically embedded in the plastic coating. Various methods for embedding the glass beads in the dry strippable carrier 10 are now well known, e.g. see the aforementioned U.S. Pat. No. 3,172,942.

A reflective coat 16 comprising nacreous pigment 19 in a transparent binder 17 material is applied over the exposed portion of the glass microspheres. An adhesive coat 18 is provided over the reflective coat. The adhesive coat may be a thermoplastic or thermosetting adhesive, or even a pressure-sensitive adhesive, if desired. The adhesive coat is pigmented, normally with a pigment material which reinforces or complements the color of the nacreous pigment containing reflective coat 16.

Figure 3:
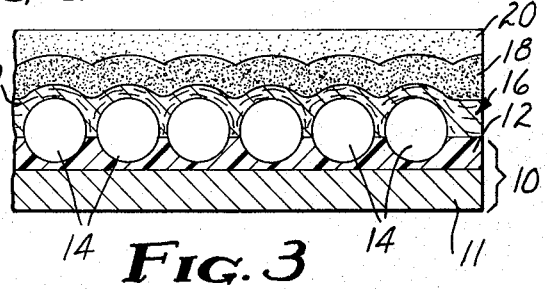
FIG. 3 is a cross-sectional view of an alternate embodiment similar to that shown in FIG. 2 but having an additional adhesive layer over the pigmented thermoplastic adhesive layer.

In an alternative embodiment shown in FIG. 3, the adhesive coat 18 is supplemented by an additional adhesive layer 20. This additional adhesive layer is employed where a particularly strong bond to the fabric or other substrate is desired.

Figure 2:
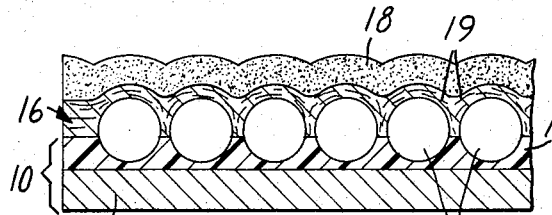
FIG. 2 is a cross-sectional view of a further stage in the manufacturing process of a fabric or transfer foil according to the instant invention in which the structure of FIG. 1 has been further coated with a nacreous pigment-containing transparent binder layer and overcoated with a pigmented thermo-plastic adhesive layer.
Figure 4:
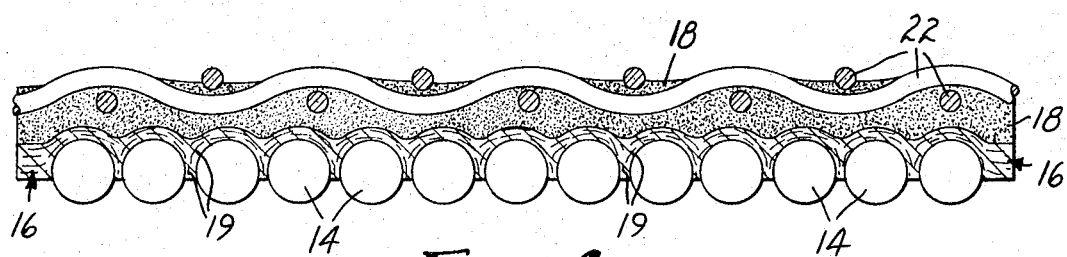
FIG. 4 is a cross-sectional view of a reflex-reflecting fabric according to the instant invention in which the material of FIG. 2 has been heat-laminated to a piece of fabric, and the temporary carrier base and its carrier coating have been stripped away to expose the portion of the glass microspheres on the side away from the fabric.

In FIG. 4, the adhesive surface of the sheet material according to FIG. 2 has been brought in contact with a fabric 22 and laminated thereto by the application of heat and pressure. Subsequent to the lamination step, the carrier 10 is stripped away from the top of the glass beads, thereby exposing the glass beads and providing a reflex-reflecting fabric. This fabric may be supplied to manufacturers who will then form garments out of the fabric, or will cut out strips or insignia from the reflex-reflecting fabric and incorporate such segments into, or sew them onto another garment.

Figure 5:
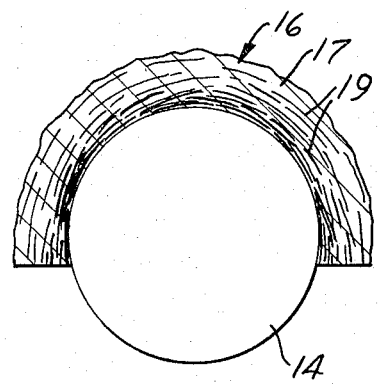
FIG. 5 is a broken away, cross-sectional schematic view of a part of the nacreous pigment-containing transparent binder approximately hemispherically surrounding a glass microsphere whereby a reflex-reflecting element is formed.

Referring now to FIG. 5, a partially schematic illustration of a single lens element of FIG. 4 is shown. The glass beads 14, used in the practice of the invention, should have an average diameter within the range of 25 to 250 microns. If the average size of the glass beads is substantially below 25 microns considerable loss in reflex-reflecting efficiency is observed. If the average bead size exceeds 250 microns the flexibility and hand of the resulting fabric is somewhat impaired, and the appearance of the fabric is not as pleasing aesthetically. Beads within the size range of 50 to 90 microns are preferred. The reflective coat 16 comprises a flexible transparent binder 17 and flakes of nacreous pigment 19. Nacreous pigments (sometimes called pearlescent pigments) are well known in the art. In particular, synthetic nacreous pigments are now available from several different manufacturers. In general, such pigment particles are available in several grades or carefully controlled size ranges, the platelet size generally ranging from about three to about at least 40 microns in their maximum surface dimension, and from 20 to 400 or more millimicrons in thickness. Naturally occurring nacreous materials can have even greater variation in size and thickness.

In the practice of the present invention, one selects specularly reflective nacreous pigment within the size range of eight to 30 microns and thicknesses in the range of about 25 to 200 millimicrons, preferably 35 to 70 millimicrons. Utilization of those pigments which have a maximum dimension size falling within the range of 10 to 25 microns being especially useful, and those within the range of 16 to 24 microns being particularly preferred.

Figure 8:
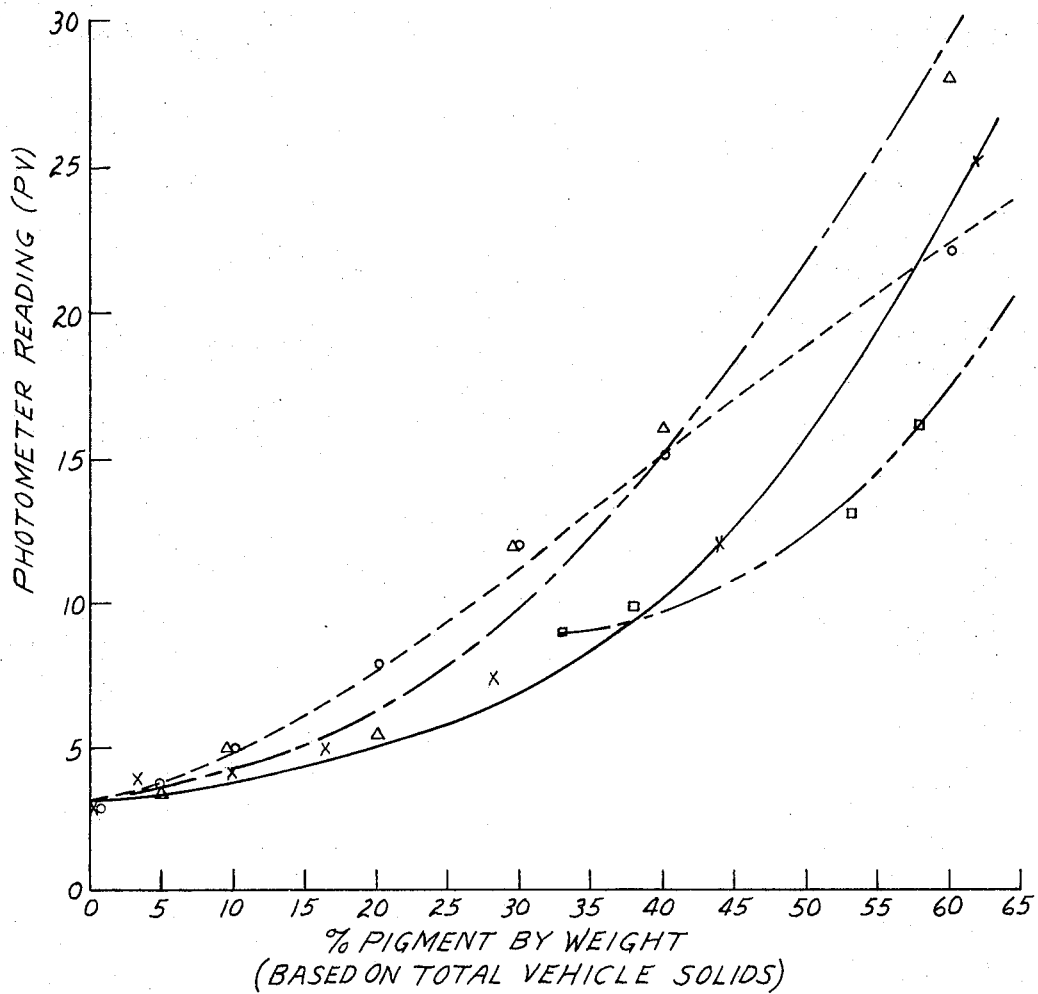
FIG. 8 is a graph illustrating the unexpected increase in reflective brilliance in terms of photometer readings (ordinate) of various percentages by weight of nacreous pigment based on the total vehicle solids (abscissa) in the binder layer.

Furthermore, as illustrated in FIG. 8, unless one utilizes at least 15 percent by weight of nacreous pigment based on the total vehicle solids, the level of reflex-reflective brilliance is so low that the structure offers little or no advantage under nighttime viewing conditions over an otherwise equivalent structure without any nacreous pigment. Likewise, if the structure only contained $TiO_2$ pigment, the PV readings would not exceed about 6 or 7. It should be noted that when used for safety purposes, such as when used as reflective trim on clothing, the total reflective area is so small that the highest possible reflective brilliance is desired, and structures with PV's of 25, and even 40 are attainable with the present invention, making them many orders of magnitude more observable to the driver of a vehicle than a fabric or sign with a PV of 5 or 7.

More specifically, the data for FIG. 8 was obtained by adding various amounts of weight of nacreous pigment (based on the total solids content) to a transparent solution of binder, and preparing a reflex-reflecting fabric in the same manner as more fully described hereinafter in Example I. PV readings were taken and plotted on the graph based on the following table:

PV reading for

| % pigment | pigment △ | pigment X | pigment ○ | pigment □ |
|---|---|---|---|---|
| 0. | | 3 | 3 | |
| 3.8 | | 4 | | |
| 5.0 | 3.5 | | 3.7 | |
| 10.0 | 5 | | 5 | |
| 10.2 | | 4.25 | | |
| 16.4 | | 5 | | |
| 20.0 | 5.25 | | 8 | |
| 28.1 | | 7.5 | | |
| 30.0 | 12. | | 12 | |
| 33.0 | | | | 9 |
| 38.0 | | | | 10 |
| 40.0 | 16 | | 15 | |
| 44.0 | | 12 | | |
| 53.0 | | | | 13 |
| 58.0 | | | | 16 |
| 60.0 | 28 | | 22 | |
| 62.0 | | 25 | | |

In the above table pigments △ and ○ are nacreous pigment believed to have a maximum dimension in the range of 14 to 18 microns and pigment thicknesses in the approximate range of 40 to 45 millimicrons. The △ pigment had 3 percent by weight of a fluorescent dye admixed therewith.

Pigment X was nacreous pigment having a maximum dimension in the range of 16 to 20 microns and pigment thicknesses in the approximate range of 45 to 60 millimicrons.

Pigment □ was nacreous pigment believed to have a maximum dimension in the range of 10 to 14 microns and thicknesses in the approximate range of 30 to 40 millimicrons.

Nacreous pigments of the designated size range tend to orient or arrange themselves with their flat surfaces in approximate tangential relationship, preferably in at least partial contact, with the coated portion of the glass microspheres. This arrangement provides for a good reflex-reflection efficiency. As the size of the nacreous pigment falls below about 10 microns in diameter there is less tendency for the nacreous pigment to orient and contact the glass beads in the just described manner, and they are therefore less efficient as a reflector of incident light rays. If the average nacreous pigment particle size is below five microns, apparently many of the platelets have their edges rather than their major surfaces contacting the surface of the glass microspheres, there is more scattering of light, and a satisfactory reflex-reflecting structure is not provided.

Figures 6, 7:
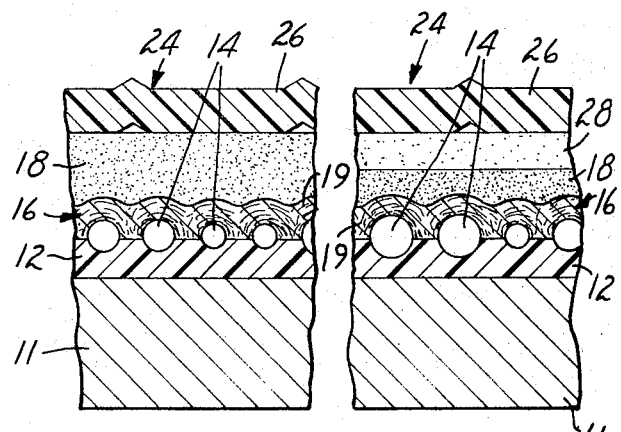
FIG. 6 is a cross-sectional view of a transfer film according to the present invention in which the glass microspheres are hemispherically embedded in a dry strippable carrier base as in FIG. 1, and have coated thereover a nacreous pigment-containing reflective coat and an adhesive layer, the adhesive layer being protected by an embossed, temporary low adhesion liner.
FIG. 7 is a broken away, cross-sectional view of an alternate form of transfer film according to the present invention, the structure being the same as in FIG. 6, except that an additional, different type of adhesive layer has been provided in place of part of the adhesive layer as illustrated in FIG. 6.

Referring now to FIG. 6, a reflex-reflective transfer film 24 is shown, this construction is substantially identical to that which is shown in FIG. 2, except that an embossed, temporary removable liner 26 is provided over the adhesive layer 18 so as to protect it from contamination during storage or shipment prior to application to a substrate. The liner 26 also helps protect the structure while cutting the transfer film into any desired insignia or shape.

FIG. 7 is an alternate embodiment of a transfer film which is particularly adapted for use by housewives and others who do not have the facilities for closely controlling lamination pressures and temperatures. In this embodiment, a portion of the thickness of the adhesive layer 18 is replaced by a layer of a thermoplastic adhesive 28 which has a lower melting point and lower viscosity at fusion temperatures thus making it easier for the housewife to laminate the film to a fabric or article of clothing using a hand iron.

The transparent binder selected must be relatively colorless, resistant to chemicals used in cleaning and laundering, having reasonably good exterior durability, be capable of flexing without cracking or breaking, and form a strong bond to the beads so they resist dislodgment by rubbing or scraping.

The binders may be either thermoplastic or thermosetting. Examples of resins which could be used as the transparent binder are certain of the acrylic resins, and some of the alkyd, polyurethane and epoxy resins.

A particularly preferred material for use as the transparent binder is a composition based on a thermoplastic polyurethane resin admixed with about an equal amount of a vinyl chloride:vinyl acetate copolymer resin and containing a minor amount of an epoxy resin. A binder composed of this composition (which is more fully described in conjunction with the following examples), provides a firm bead bond, is flexible over a fairly wide temperature range, and is resistant to degradation by solvents commonly employed in (chemical) dry cleaning or laundering operations.

In order to color the binder layer various transparent pigments or dyes may be added, or a primary pigment such as $TiO_2$ may be added. One of the problems facing prior art workers seeking to make a white reflex-reflecting fabric utilizing $TiO_2$ as the reflective pigment is the fact that so much $TiO_2$ must be added to the binder layer to achieve good color and reflex-reflection that the ability to bond the beads was impaired and such structures or fabrics lacked durability and resistance to abrasion while being worn, and during cleaning and laundering. In the present invention in order to produce a white fabric it is not necessary to use any $TiO_2$ in the binder layer although a relatively minor amount of $TiO_2$ may be used, e.g. no more than 20 percent by weight based on solid binder resin, because of the use of the nacreous pigment of specific size to provide for retroreflection of incident light rays.

In order to produce an intense blue, green, red or other colored construction, a like-colored transparent or translucent pigment is added to the binder by milling, the amount thereof likewise being limited so that it does not substantially interfere with reflex-reflective efficiency. One may alternately employ a dye if desired.

To enhance the color of the binder layer, an opaque colored base or adhesive layer may be superimposed on the binder layer.

The preparation of white and various colored fabrics is illustrated in the following Examples, as well as the construction of a sign, and a particularly satisfactory transparent binder resin system is disclosed, all parts being parts by weight unless otherwise indicated.

EXAMPLE I

A white reflex-reflecting fabric was prepared as follows. Glass beads of 1.9 refractive index and having diameters between 50 to 75 microns are heat sunk on polyethylene coated paper to their mid points. The exposed portion of the bead layer is then coated to a wet thickness of about 150 microns with the following resinous reflective layer:

| | Parts by weight |
|---|---|
| High crystalline polyurethane resin (Estane 5740 × 130 from B. F. Goodrich) | 23.5 |
| A copolymer of 86:13 by weight vinyl chloride-vinyl acetate resin with 1% interpolymerized maleic acid (VMCH resin from Union Carbide) | 20.0 |
| Methyl ethyl ketone | 106.5 |
| Epoxy resin (Shell Epon 828) | .75 |
| Dimethyl formamide | 75.0 |
| Nacreous pigment paste (XVT Pearlescent Paste from Mearl Corp.) | 100.0 |

The polyurethane resin has the following physical properties:

| | |
|---|---|
| Specific gravity | 1.20 |
| Hardness Shore durometer A | 95 |
| Tensile strength | 9800 |
| Modulus at 300% elongation (psi) | 930 |
| Elongation | 730 |

The epoxy resin is prepared from epichlorohydrin and Bisphenol-A and has an epoxy equivalent weight of 180–195 and a viscosity of 10,000 to 16,000 cps. The pigment paste is a paste containing 35 percent by weight of lead carbonate platelets or crystals having their major dimension falling within the range of 14 to 22 microns and averaging about 18 microns, the platelets being suspended in a polyvinyl chloride-methyl isobutyl ketone solution. The nacreous pigment amounted to 44.2 percent by weight of the total binder solids and thicknesses in the approximate range of 40 to 45 millimicrons.

This reflective layer is forced dried at 80°C. for 15 minutes. An adhesive layer is next applied to the reflective layer by knife coating at a wet thickness of approximately 405 microns with the following resinous solution:

| | Parts by weight |
|---|---|
| Toluol | 15.50 |
| Methyl ethyl ketone | 29.55 |
| Dioctyl phthalate | 15.00 |
| Epoxy type resin stabilizer (Ferro 900) | 0.25 |
| Resin stabilizer of the barium/cadmium salt of synthetic carboxylic acid with organic inhibitor type (Ferro 1203) | 0.25 |
| Resin stabilizer of the cadmium/organic inhibitor type (Ferro 203) | 0.35 |
| 87:13 by weight vinyl chloride:vinyl acetate resin (VYHH — Union Carbide) | 22.50 |
| Polyurethane resin (Estane 5740 × 130) | 8.30 |
| $TiO_2$ | 8.30 |

This layer was cured at 60°C. for 20 minutes.

Following the cure of the adhesive layer, the coated side of the web was laminated to an 8 ounce Twill fabric consisting of 65 percent cotton and 35 percent polyester. The laminating was accomplished at 155°C. and 20 psi. The polyethylene paper was then removed to expose the beaded surface which is reflex-reflective. When measured on a photometer the retro-reflective efficiency was PV–18.4. The fabric had good flexibility and was "pure" white in appearance. The material withstood repeated flexing and laundering.

EXAMPLE II

This example illustrates preparation of a blue fabric. A carrier web of polyethylene coated paper was bead coated in the same manner and with the same glass beads as described in Example I. This beaded web was then reflector coated at a wet thickness of about 155 microns with the following resinous solution:

| | Parts by weight |
|---|---|
| Polyurethane resin as in Example I | 23.5 |
| The 86:13 vinyl chloride-vinyl acetete resin as in Example I | 20.0 |
| Methyl ethyl ketone | 106.5 |
| Epoxy resin as in Example I | .75 |
| Dimethyl formamide | 75.0 |
| Phthalocyanine blue pigment | 2.0 |
| Nacreous pigment paste as in Example I | 100.0 |

The phthalocyanine blue pigment was ball milled to a fineness of grind of 7 or higher (Hegman reading) in a slurry with all of the constituents except that nacreous pigment. The nacreous pigment which amounted to 43.1 percent of the total vehicle solids was added with stirring just prior to coating.

This reflective layer was dried for 15 minutes at 80°C.

An opaque colored base coat was next applied by knife coating at a wet thickness of about 105 microns with the following composition:

| | Parts by weight |
|---|---|
| Polyurethane resin as in Example I | 23.5 |
| The 86:13 vinyl chloride-vinyl acetate resin as in Example I | 20.0 |
| Methyl ethyl ketone | 106.5 |
| Epoxy resin as in Example I | .75 |
| Phthalocyanine blue pigment | 5.0 |
| $TiO_2$ | 7.0 |

This coating was applied directly to the reflector coat and given the same drying cycle.

An adhesive layer of the same composition as described in Example I was applied as therein described, cured at 60°C. for 20 minutes and laminated to cloth as in Example I. The retroreflecting beaded layer was exposed by stripping away the polyethylene paper. The reflective efficiency was PB=15.2. The color was a bright blue, being of better saturation than that of prior art blue fabrics.

EXAMPLE III

This Example illustrates the preparation of an orange fluorescent reflective fabric. Bead coated polyethylene paper was reflectorized as in the previous two Examples, by applying a reflector coat at a wet thickness of approximately 205 microns which was composed of the following:

| | Parts by weight |
|---|---|
| Polyurethane resin as in Example I | 23.5 |
| The 86:13 vinyl chloride-vinyl acetate resin as in Example I | 20.0 |
| Methyl ethyl ketone | 106.6 |
| Epoxy resin as in Example I | 0.75 |
| Blaze orange pigment (Switzer T-15) | 40.0 |
| Nacreous pigment as in Example I | 50.0 |

The orange pigment was milled into the vinyl resin-methyl ethyl ketone solution by means of a pebble mill prior to the addition of the other constituents. Cure was for 15 minutes at 80°C. The nacreous pigment constituted 17.2 percent of the solids of the dried reflective binder layer. An opaque colored base coat was knife coated at a wet thickness of approximately 155 microns over the reflective coat. The opaque colored base coat had the following composition:

| | Parts by weight |
|---|---|
| Polyurethane resin as in Example I | 23.5 |
| Vinyl resin copolymer as in Example I | 20.0 |
| Methyl ethyl ketone | 106.5 |
| Epoxy resin as in Example I | 0.75 |
| $TiO_2$ | 20.0 |

Grinding was accomplished on a Cowles Dissolver.

The relatively large amount of $TiO_2$ that was used in this opaque colored coat as compared to the amount employed in the previous Examples provided a more intense or brighter appearing fluorescent reflective layer.

An adhesive coat as in Example I was then superimposed over the opaque colored layer and the film was laminated to cloth under the same conditions as in Example I. The beads were exposed by removing the polyethylene coated paper. The retroreflective efficiency was PV=3.5 which was due to the large amount of blaze orange pigment, the latter impairing the optical efficiency by obscuring the nacreous pigment.

EXAMPLE IV

This Example illustrates production of a white reflex-reflecting transfer film which is particularly useful for use by individual consumers, such as housewives.

Glass beads of 1.9 refractive index and ranging from about 45 to 75 microns in diameter were heat sunk on polyethylene coated paper to their mid-points as in the previous Examples. The exposed portion of the beads was then coated at a wet thickness of about 125 microns with the following transparent resinous reflective binder composition:

| | Parts by weight |
|---|---|
| Polyurethane resin as in Example I | 23.5 |
| The 86:13 vinyl resin copolymer as in Example I | 20.0 |
| Methyl ethyl ketone | 106.5 |
| Epoxy resin as in Example I | 0.75 |
| Dimethyl formamide | 75.0 |
| Nacreous pigment paste (VCQ Pearl pigment obtained from Koppers Co.) | 38.5 |

The nacreous pigment composition used in this Example was of lead carbonate platelets having a maximum dimension in the range of 16 to 20 microns and averaging abou 18 microns with thicknesses in the approximate range of 45 to 60 millimicrons. There was 60 percent by weight of the pigment in a paste of polyvinyl chloride resin dissolved in methyl isobutyl ketone and the pigment constituted 34.3 percent by weight of the total vehicle solids.

This reflective layer was force dried at about 107°C. for four minutes. An opaque adhesive layer was next applied to the reflective layer by knife coating at a wet thickness of about 250 microns, the same adhesive layer as was used in Example I.

This layer was cured at about 93°C. for 5 minutes. A third layer of adhesive material, which is identical to the second layer except that it contains no $TiO_2$, was applied at a wet thickness of about 125 microns, cured at 93°C. for four minutes, then laminated to a 50 micron thick embossed polyethylene release liner. This construction may be converted to strips or rolls and is capable of being transferred to any fabric or garment by heat lamination using an ordinary household iron. One cuts the transfer construction to the desired size, removes the polyethylene liner and applies the exposed adhesive side against the material in the desired position. An iron heated to about 85° to 160°C. is used with firm pressure to laminate to the fabric, with the time of exposure to the iron being between 30 and 60 seconds. When the piece has cooled, the polyethylene coated paper carrier covering the top portion of the beads is peeled away, exposing the white reflective bead layer, PV = 15.

EXAMPLE V

A bead bond vehicle was made by mixing the following materials:

| | Parts by weight |
|---|---|
| Siliconized short oil soybean alkyd resin, 65% solids (Aroplaz M 519) | 93.97 |
| Alkylated melamine formaldehyde condensate resin (Cymel 248-10) | 5.47 |
| Mineral spirits solution of the manganese soap of napthenic acid containing 6% manganese | 0.35 |
| A solution of 1,10 phenanthroline in a mixed solvent system (Active 8 driers) | 0.21 |
| A 65% solids dispersion of lead carbonate platelets in methyl cellosolve (Nacromer XSP Pearlescent pigment) | 100.0 |
| Xylol | 40 |

This liquid composition was spray painted at a wet thickness of about 0.004 to 0.006 inches onto an embossed metallic sign blank which had earlier been prime coated with a white alkyd resin based primer. Following the spray application the solvent was allowed to dry for three minutes after which glass beads of approximately 100 microns in diameter and 1.92 refractive index were cascade coated over the tacky surface. The sign was then placed in a 200°F. oven and baked for 15 minutes. Following the baking a black ink was rolled onto the embossed front face of the sign. The nacreous pigment had maximum dimensions in the range of 14 to 18 microns and thicknesses in the approximate range of 40 to 50 millimicrons. The product is a black on white sign having a PV of 30. The nacreous pigment constituted 50 percent by weight based on total solids content of the binder layer, prior to application of the beads.

While the above Examples illustrate the presently preferred method of manufacturing reflex-reflecting transfer films and fabrics, other methods may be employed. For example, one or more of the successive coatings could be applied to the liner 26 or the fabric, and the beads could be drop-coated onto the reflective layer while it is still wet, such as was done in Example V. In this regard, it should be noted that the reflective coat should have enough solvent present at the time of application to allow "leafing" of the nacreous pigment so that a substantial number of the platelets may form a reflective layer in cup-like tangential contact with the embedded portions of the glass beads.

As is known in the art, with an air-bead interface, the most efficient reflex-reflection is obtained with glass beads having a refractive index of about 1.90 to 1.93. If the bead surface is wet with water, then beads having a refractive index of about 2.5 provide the most efficient reflex-reflection. Accordingly, it may be desirable to utilize a mixture of 1.9 and 2.5 index glass beads in preparing articles according to the invention, particularly where the intended use is on articles of apparel such as rain coats.

What is claimed is:

1. A reflex-reflective structure comprising a monolayer of glass beads firmly approximately hemispherically embedded and bonded in a binder layer containing reflective pigment, individual beads having said reflective pigment arranged in cup-like fashion about the embedded portion of said beads, said structure being characterized in that the reflective pigment arranged about the said beads comprises specularly reflective nacreous pigment particle platelets having a maximum dimension which falls within the range of 8 to 30 microns and which is less than the diameter of said beads and having a thickness within the range of 25 to 200 millimicrons, the concentration of said nacreous pigment particle platelets being at least 15 percent by weight of the total solids in said binder layer.

2. A reflex-reflective structure according to claim 1 in which said binder is transparent.

3. A reflex-reflective structure according to claim 1 in which the nacreous pigment particles have an average maximum dimension within the range of 16 to 24 microns and an average thickness within the range of 35 to 70 millimicrons.

4. A flexible reflex-reflecting transfer film which when laminated to a fabric provides a product having a high degree of color intensity and resistance to degradation by dry cleaning, said structure comprising a monolayer of glass beads within the size range of 25 to 250 microns and having a refractive index of at least 1.8, said beads being firmly approximately hemispherically embedded and bonded in a flexible binder layer comprising a substantially transparent, clear and colorless flexible resin and specularly reflective nacreous pigment particle platelets having a maximum dimension which falls within the range of eight to 30 microns and which is less than the diameter of said beads, individual beads having platelets arranged in cup-like fashion about the embedded portion of said beads, the concentration of said platelets being at least 15 percent by weight of the total solids in said binder.

5. A reflex-reflecting transfer film according to claim 4 in which the glass beads are in the size range of 50 to 90 microns and have a refractive index of at least 1.9, and the nacreous pigment particles have an average maximum dimension within the range of 16 to 24 microns.

6. A reflex-reflecting transfer film according to claim 5 in which the transparent binder comprises a mixture of about equal amounts of a highly crystalline polyurethane resin and a vinyl resin which is a copolymer containing a major proportion of polyvinyl chloride and a minor proportion of polyvinyl acetate.

7. A transfer film according to claim 4 in which the binder layer has thereover, on the side opposite the protruding glass beads, a thermoplastic opaque colored layer.

8. A transfer film according to claim 1 laminated to a fabric.

9. A transfer film according to claim 7 in which a thermoplastic adhesive layer is superimposed on said colored layer, the adhesive layer is protected by a low adhesive release liner and the portion of the glass beads protruding from the reflective layer are embedded in a dry strippable carrier.

10. A reflex-reflecting structure which is resistant to degradation by laundering and dry cleaning and which has a high degree of color intensity, said structure comprising a layer of fabric and a surface layer thereon comprising a substantially clear and colorless transparent flexible resin into which are firmly and approximately hemispherically embedded and bonded glass beads within the size range of 25 to 250 microns and having a refractive index of at least 1.8, and containing specularly reflective nacreous pigment particle platelets having a maximum dimension which falls within the range of eight to 30 microns and which is less than the diameter of said beads, at least some of said platelets being disposed in at least approximately tangential and cup-like relationship to the embedded surfaces of said beads, the concentration of said platelets being at least 15 percent by weight of the total solids in said resin.

11. A reflex-reflecting structure according to claim 10 having a flexible opaque color layer between said adhesive layer and said binder layer.

12. The reflex-reflecting structure of claim 10 wherein said nacreous pigment particle platelets are essentially the sole particulate material in said binder layer.

13. A reflex-reflecting transfer film according to claim 4 in which said binder layer also includes up to about 50 percent by weight based on solid resin binder, of a colorant.

14. A reflex-reflecting transfer film according to claim 6 in which the binder includes about one part of epoxy resin for each 40 parts of urethane and vinyl resin.

15. A reflex-reflective structure according to claim 10 in which said binder layer comprises the reaction produce of a mixture of about equal parts by weight of a highly crystalline polyurethane resin, and a vinyl resin, said vinyl resin being a copolymer of a major proportion of polyvinyl chloride and a minor proportion of polyvinyl acetate, and of about 1 part by weight of an epoxy resin for each 40 parts of said urethane and vinyl resins.

16. A reflex-reflective structure according to claim 10 in which said binder layer also includes up to about 50 percent by weight based on solid resin binder, of a colorant.

* * * * *

UNITED STATES PATENT OFFICE
CERTIFICATE OF CORRECTION

PATENT NO. : 3,758,192
DATED : September 11, 1973
INVENTOR(S) : WALLACE KARL BINGHAM It is certified that error appears in the above-identified patent and that said Letters Patent are hereby corrected as shown below:

In Column 8, lines 33, the word "that" should read -- the --.

In Column 10, line 52, the figure "50" should read -- 45 --.

In Claim 9, line 4, the word "adhesive" should read -- adhesion --.

Signed and Sealed this sixteenth Day of September 1975

[SEAL]

Attest:

RUTH C. MASON
Attesting Officer

C. MARSHALL DANN
Commissioner of Patents and Trademarks